United States Patent
Choo et al.

(10) Patent No.: US 12,545,635 B2
(45) Date of Patent: *Feb. 10, 2026

(54) SYSTEM AND METHOD FOR PRODUCING DIESTER-BASED COMPOSITION

(71) Applicant: LG CHEM, LTD., Seoul (KR)

(72) Inventors: Yeon Uk Choo, Daejeon (KR); Sung Kyu Lee, Daejeon (KR); Jae Hun Jeong, Daejeon (KR)

(73) Assignee: LG Chem, Ltd., Seoul (KR)

( * ) Notice: Subject to any disclaimer, the term of this patent is extended or adjusted under 35 U.S.C. 154(b) by 918 days.

This patent is subject to a terminal disclaimer.

(21) Appl. No.: 17/616,912

(22) PCT Filed: Sep. 10, 2020

(86) PCT No.: PCT/KR2020/012236
§ 371 (c)(1),
(2) Date: Jul. 26, 2022

(87) PCT Pub. No.: WO2021/060749
PCT Pub. Date: Apr. 1, 2021

(65) Prior Publication Data
US 2022/0356144 A1 Nov. 10, 2022

(30) Foreign Application Priority Data

Sep. 25, 2019 (KR) .................. 10-2019-0118185

(51) Int. Cl.
| | | |
|---|---|---|
| *C07C 67/08* | (2006.01) | |
| *B01J 19/00* | (2006.01) | |
| *C07C 67/54* | (2006.01) | |

(52) U.S. Cl.
CPC ........... *C07C 67/08* (2013.01); *B01J 19/0046* (2013.01); *C07C 67/54* (2013.01); *B01J 2219/00452* (2013.01)

(58) Field of Classification Search
CPC ......... B01J 19/0046; B01J 2219/00452; C07C 67/08; C07C 67/54; C07C 69/82
See application file for complete search history.

(56) References Cited

U.S. PATENT DOCUMENTS

| | | | | |
|---|---|---|---|---|
| 3,390,135 A | * | 6/1968 | Seiner .................. | C08F 283/01 526/71 |
| 5,606,102 A | | 2/1997 | Fauconet et al. | |
| 2008/0177099 A1 | | 7/2008 | Miyake | |
| 2011/0251420 A1 | | 10/2011 | Disteldorf et al. | |
| 2011/0263770 A1 | | 10/2011 | Yoon et al. | |
| 2011/0301377 A1 | | 12/2011 | Peters et al. | |
| 2013/0053492 A1 | | 2/2013 | Yoon et al. | |
| 2013/0303800 A1 | | 11/2013 | Shimizu | |
| 2014/0107306 A1 | * | 4/2014 | Mazanec ............. | C10G 29/205 562/487 |
| 2015/0141691 A1 | * | 5/2015 | Disteldorf .............. | C07C 67/08 560/99 |
| 2019/0263745 A1 | | 8/2019 | Lee et al. | |
| 2020/0391168 A1 | | 12/2020 | Sakabe et al. | |
| 2021/0040026 A1 | | 2/2021 | Lee et al. | |
| 2022/0212157 A1 | | 7/2022 | Choo et al. | |

FOREIGN PATENT DOCUMENTS

| | | | |
|---|---|---|---|
| CN | 102256922 A | | 11/2011 |
| CN | 102256923 A | | 11/2011 |
| CN | 207169704 | * | 4/2018 |
| CN | 110114336 A | | 8/2019 |
| JP | 6-157407 A | | 6/1994 |
| JP | 2596635 B2 | | 4/1997 |
| JP | 11-49726 A | | 2/1999 |
| JP | 4158396 B2 | | 10/2008 |
| JP | 2012-505877 A | | 3/2012 |
| JP | 2012-512229 A | | 5/2012 |
| JP | 2012-512231 A | | 5/2012 |
| JP | 2022-536616 A | | 8/2022 |
| KR | 10-1996-0004312 A | | 2/1996 |
| KR | 10-2010-0042579 A | | 4/2010 |
| KR | 10-2011-0101205 A | | 9/2011 |
| KR | 10-2013-0115274 A | | 10/2013 |
| KR | 10-1663586 B1 | | 10/2016 |
| KR | 10-1838815 B1 | | 3/2018 |
| KR | 10-2019-0027622 A | | 3/2019 |
| KR | 10-2019-0027623 A | | 3/2019 |
| KR | 10-2019-0041972 A | | 4/2019 |

OTHER PUBLICATIONS

CN207169704 translation (Year: 2018).*
Wang et al., "Coal Chemical Production Technology", Chongqing University Press, Jan. 2017, pp. 222-224.
Janjua, et al. "Systemic Uptake of Diethyl Phthalate, Dibutyl Phthalate, and Butyl Paraben Following Whole-body Topical Application and Reproductive and Thyroid Hormone Levels in Humans", Environmental Science and Technology, 2007, vol. 41, pp. 5564-5570.
Rahman, et al. "The Plasticizer Market: An Assessment of Traditional Plasticizers and Research Trends to Meet New Challenges", Progress in Polymer Science, 2004, vol. 29, pp. 1223-1248.

* cited by examiner

*Primary Examiner* — Andrew D Kosar
*Assistant Examiner* — Blaine G Doletski
(74) *Attorney, Agent, or Firm* — Bryan Cave Leighton Paisner LLP

(57) ABSTRACT

The present disclosure relates to a system which increases the efficiency of an entire process by integrating a reflux unit in a system for producing a diester-based composition in which a plurality of reactors are connected in series.

9 Claims, 4 Drawing Sheets

SYSTEM AND METHOD FOR PRODUCING DIESTER-BASED COMPOSITION

CROSS-REFERENCE TO RELATED APPLICATIONS

This application is a National Phase entry pursuant to 35 U.S.C. § 371 of International Application No. PCT/KR2020/012236, filed on Sep. 10, 2020, and claims the benefit of and priority to Korean Patent Application No. 10-2019-0118185, filed on Sep. 25, 2019, in the Korean Intellectual Property Office, the disclosures of which are hereby incorporated by reference in their entirety for all purposes as if fully set forth herein.

TECHNICAL FIELD

Technical Field

The present invention relates to a system for producing a diester-based composition, which increases the production efficiency of a diester-based composition by improving an alcohol reflux process in a process of continuously producing a diester-based composition.

Background Art

Phthalate-based plasticizers had occupied 92% of the world's plasticizer market by the 20th century (Mustafizur Rahman and Christopher S. Brazel "The plasticizer market: an assessment of traditional plasticizers and research trends to meet new challenges" Progress in Polymer Science 2004, 29, 1223-1248), and are additives used to improve the processability of polyvinyl chloride (hereinafter, referred to as PVC) by imparting flexibility, durability, cold resistance, and the like and lowering viscosity during melting. Phthalate-based plasticizers are introduced into PVC in various contents and used not only for hard products such as rigid pipes, but also for soft products such as food packaging materials, blood bags, and flooring materials since the phthalate-based plasticizers are soft and stretchable. Thus, the phthalate-based plasticizers are more closely related to real life than any other materials and are widely used for materials which come into direct contact with a human body.

However, despite the compatibility with PVC and excellent softness imparting properties of phthalate-based plasticizers, there has been controversy over the harmful nature of the phthalate-based plasticizers in that when a PVC product containing a phthalate-based plasticizer is used in real life, the phthalate-based plasticizer may be leaked little by little out of the product and act as a suspected endocrine disruptor (environmental hormone) and a carcinogen to the level of a heavy metal (N R Janjua et al. "Systemic Uptake of Diethyl Phthalate, Dibutyl Phthalate, and Butyl Paraben Following Whole-body Topical Application and Reproductive and Thyroid Hormone Levels in Humans" Environmental Science and Technology 2007, 41, 5564-5570). Particularly, since a report was published in the 1960s in the United States that diethylhexyl phthalate (di-(2-ethylhexyl) phthalate, DEHP), the most used phthalate plasticizer, leaked out of PVC products, global environmental regulations have started to be implemented in addition to various studies on the harmful nature of the phthalate-based plasticizer on human bodies, boosted by increasing interest in environmental hormones in the 1990s.

Thus, in order to respond to environmental hormonal problems and environmental regulations due to the leakage of a phthalate-based plasticizer, di(2-ethylhexyl) phthalate in particular, many researchers have been conducting research in order to develop a new non-phthalate-based alternative plasticizer without phthalic anhydride used in the manufacturing of di(2-ethylhexyl) phthalate, and to develop a phthalate-based plasticizer which may replace di(2-ethylhexyl) phthalate and be used for industrial purposes since the leakage of the plasticizer is suppressed even though it is based on phthalate, as well as to develop a leakage suppression technology which suppresses the leakage of phthalate-based plasticizers, thereby significantly reducing risks to human bodies and which meets environmental standards.

As such, as diester-based plasticizers, the development of materials which are free from environmental problems and which may replace a di(2-ethylhexyl) phthalate having existing environmental problems is actively underway. In addition, research on developing a diester-based plasticizer with excellent physical properties as well as research on equipment for manufacturing the plasticizer have been actively conducted, and there has been a demand for more efficient, more economical and simpler process designs in terms of process design.

Meanwhile, a batch process is being applied in most industrial sites as a process of producing the above diester-based plasticizer. As the batch process, an invention related to a gas-liquid separation system for the reflux of non-reactants and efficient removal of sub-reactants in a reactor (Korean Patent Laid-Open Publication No. 10-2019-0027622) and an invention related to a system integrating facilities of a primary direct esterification reaction and a second trans-esterification reaction in order to simplify facilities of a batch process (Korean Patent Laid-Open Publication No. 10-2019-0027623) have been introduced. However, as a batch process, such inventions have limitations in that there is a limit to the improvement in the amount of reflux or the volume of steam, the productivity is very low, and there is a limit to the technology which may be applied for improvement.

In addition, as a continuous process, an invention related to a process configuring a reaction part by connecting two or more reactors in series (Korean Patent Publication No. 10-1663586) has also been introduced. However, the invention relates to the control of a reaction temperature of a reactor for achieving a target conversion, and there is a limit to the improvement of a process and energy saving.

PRIOR ART DOCUMENT (Patent Document 1) Korean Patent Laid-Open Publication No. 10-2019-0027622
(Patent Document 2) Korean Patent Laid-Open Publication No. 10-2019-0027623
(Patent Document 3) Korean Patent Laid-Open Publication No. 10-1663586

DISCLOSURE OF THE INVENTION

Technical Problem

An aspect of the present invention is to provide an efficient system for producing a diester-based composition, wherein a plurality of reactors connected in series share one reflux unit, so that the space and cost required for installing a reflux unit is reduced to the minimum and the energy required for reflux is also reduced to the minimum, thereby improving the overall efficiency and economic feasibility of a process.

Technical Solution

According to an aspect of the present invention, there is provided a system for producing a diester-based composition, the system including a first reactor to an N-th reactor connected in series in which an esterification reaction of dicarboxylic acid and alcohol is performed and a reflux unit connected to the first reactor and selectively separating unreacted alcohol of a mixed gas generated during the reaction and then refluxing the separated unreacted alcohol to the first reactor, wherein the reflux unit includes 1) a reflux column for receiving the mixed gas and unreacted alcohol in a liquid state from the first reactor and then transferring the mixed gas to a condenser and the unreacted alcohol in a liquid state to the first reactor, 2) the condenser for condensing all of the mixed gas, and 3) a layer separator for separating alcohol and water in a condensate passed through the condenser to discharge a water layer and to allow an alcohol layer to be recovered, wherein one or more reactors selected among a second reactor to the N-th reactor are additionally connected to the reflux unit, and N is an integer of 2 to 10.

In the system for producing a diester-based composition, the reflux unit further includes 4) a pre-condenser directly connected to the reflux column and condensing a portion of the unreacted alcohol of the mixed gas, and 5) a gas-liquid separation device directly connected to the pre-condenser and receiving the mixed gas and the unreacted alcohol in a liquid state and then transferring the mixed gas to the condenser and the unreacted alcohol in a liquid state to the reflux column, wherein the alcohol layer recovered through the layer separator is transferred to the gas-liquid separation device.

Advantageous Effects

A production system of the present invention integrates each reflux unit of a plurality of reactors connected in series, so that the overall amount of energy used for the condensation alcohol is reduced and the cost and space consumed for the installation of a reflux unit can all be reduced.

MODE FOR CARRYING OUT THE INVENTION

Figure 1:
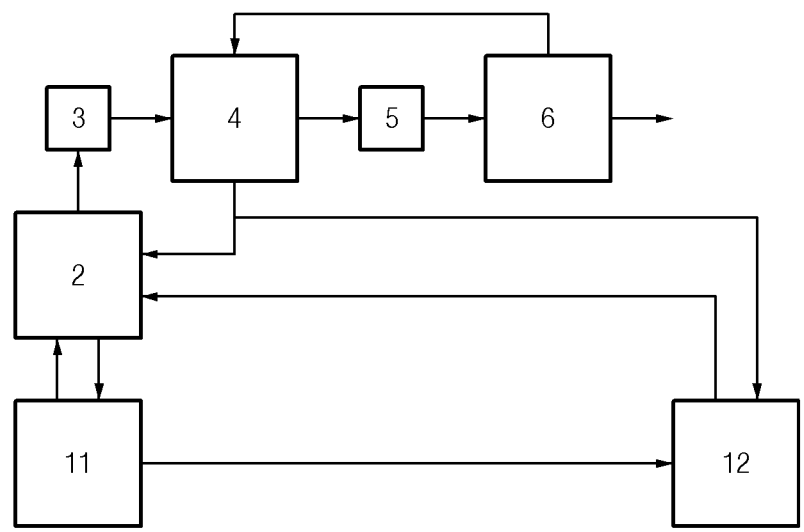
FIGS. 1 to 6 are simplified process diagrams showing a system for producing a diester-based composition according to an embodiment of the present invention.

Hereinafter, the present invention will be described in more detail.

It will be understood that words or terms used in the specification and claims of the present invention shall not be construed as being limited to having the meaning defined in commonly used dictionaries. It will be further understood that the words or terms should be interpreted as having meanings that are consistent with their meanings in the context of the relevant art and the technical idea of the invention, based on the principle that an inventor may properly define the meaning of the words or terms to best explain the invention.

System for Producing Diester-Based Composition

The present invention provides a system for producing a diester-based composition, the system including a first reactor to an N-th reactor connected in series in which an esterification reaction of dicarboxylic acid and alcohol is performed and a reflux unit connected to the first reactor 11 and selectively separating unreacted alcohol of a mixed gas generated during the reaction and then refluxing the separated unreacted alcohol to the first reactor, wherein the reflux unit includes 1) a reflux column 2 for receiving the mixed gas and unreacted alcohol in a liquid state from the first reactor and then transferring the mixed gas to a condenser and the unreacted alcohol in a liquid state to the first reactor, 2) the condenser 5 for condensing all of the mixed gas, and 3) a layer separator 6 for separating alcohol and water in a condensate passed through the condenser to discharge a water layer and to allow an alcohol layer to be recovered, wherein one or more reactors 12 selected among a second reactor to the N-th reactor are additionally connected to the reflux unit, and N is an integer of 2 to 10.

A diester-based composition is prepared by an esterification reaction of dicarboxylic acid and alcohol, which are reaction raw materials. Specifically, through the esterification reaction, a carboxyl group of the dicarboxylic acid and a hydroxy group of the alcohol are condensed to form an ester bond, and as a result, water is formed as a by-product. Meanwhile, although it may vary depending on the specific type of dicarboxylic acid and alcohol which are reaction raw materials, an esterification reaction is performed at a temperature of approximately 130 to 250° C. Therefore, the vaporization of the alcohol, which is a reaction raw material, and water, which is a by-product, can occur during the reaction. Particularly, since the vaporization of alcohol lowers the concentration of alcohol, the overall reaction rate is lowered, thereby reducing the efficiency of an overall production process. Therefore, It is necessary to improve the efficiency of the production process by recovering a mixed gas including water and alcohol both in a gaseous state generated during the reaction, and selectively re-introducing the alcohol in the mixed gas to the reactor. To this end, most diester-based composition production systems are provided with a reflux facility connected to a reactor.

Meanwhile, in the case of a system for producing a diester-based composition, wherein the system includes a plurality of reactors, a mixed gas is separately generated for each reactor, so that it is common that a reflux facility is provided for each reactor. In this case, the amount and composition of the mixed gas generated for each reactor may be different, and thus, each reflux facility should be operated to a separate setting. As described above, the operation of the plurality of reactors and the plurality of reflux facilities in a continuous process is complex, and thus, may act as a hindrance factor which makes it difficult to introduce the continuous process despite the high efficiency thereof. Therefore, the inventors of the present invention have invented a system for producing a diester-based composition, the system capable of improving the efficiency and ease of operation by allowing a plurality of reactors to be continuously operated as in the prior art, but allowing the plurality of reactors to share a single reflux unit, and also improving economic feasibility by reducing the cost and space required for installing a reflux facility.

Specifically, the system for producing a diester-based composition provided by the present invention includes a first reactor to an N-th reactor and a reflux unit having a reflux column, a condenser, and a first layer separator. The first reactor to the N-th reactor are a plurality of reactors connected in series, which are continuously operated. Specifically, the type of the reactor is not particularly limited as long as it is a reactor used in an esterification reaction. It is preferable that the reactor is a continuous reactor in that the system for producing a diester-based composition of the present invention is continuously operated. Meanwhile, the first reactor refers to a reactor disposed at the frontmost end of the plurality of reactors connected in series. In addition, in the present specification, a description such as "an X-th reactor" refers to the X-th connected reactor based on the first reactor.

The reflux unit is to perform the reflux described above, and is directly connected to the first reactor to be applied to the reflux of a mixed gas generating in the first reactor. Specifically, the reflux unit includes 1) a reflux column for receiving the mixed gas and unreacted alcohol in a liquid state from the first reactor and then transferring the mixed gas to a condenser and the unreacted alcohol in a liquid state to the first reactor, 2) the condenser for condensing all of the mixed gas, and 3) a layer separator for separating alcohol and water in a condensate passed through the condenser to discharge a water layer and to allow an alcohol layer to be recovered.

The reflux column 2 is directly connected to the first reactor, and is for receiving a mixture of alcohol and water, that is, a mixed gas, which are in a gaseous state and generated during the reaction, and for receiving alcohol liquefied through a reflux process, that is, unreacted alcohol in a liquid state, as well. The mixed gas and the unreacted alcohol in a liquid state received in the reflux column are in different phases from each other, and thus, may be easily separated. Thereafter, the mixed gas is transferred to the condenser to be condensed, and the unreacted alcohol in a liquid state is transferred to the first reactor to be used as a reaction raw material again. The shape or type of the reflux column is not particularly limited. Any reflux column may be used as long as it can separate the mixed gas and the unreacted alcohol in a liquid state. Meanwhile, the reflux column is preferable connected to an upper portion of a reactor in that the reflux column is for receiving a mixed gas generated in the reactor.

The condenser 5 is for condensing the mixed gas transferred from the reflux column into a liquid so as to separate the condensed mixed gas into alcohol and water. It is difficult to separate water and alcohol in a gaseous state. However, when the same is condensed into water and alcohol in a liquid state, water and alcohol have low solubility in each other, and thus, can be easily separated. The condenser is not particularly limited as long as it can condense all of the mixed gas including alcohol and water. For example, a heat exchanger and the like for performing heat exchange through cooling water can be used as the condenser. The condensate passed through the condenser, that is, a mixture of unreacted alcohol in a liquid state and water, is transferred to a subsequent layer separator.

In the layer separator 6, the layer separation of alcohol and water is performed. As described above, alcohol and water have different chemical properties, and thus, are not soluble in each other, so that the layer separation thereof can be easily achieved. An alcohol layer among separated layers is discharged to the gas-liquid separation device to be re-used as a reaction raw material, and a water layer is discharged to be treated as wastewater. The shape or type of the layer separator is not also particularly limited, and any layer separator which can smoothly perform the layer separation of alcohol and water can be used.

Meanwhile, in the system for producing a diester-based composition provided by the present invention, one or more reactors 12 selected from the second reactor to the N-th reactor can be additionally connected to the reflux unit. When the rest of the reactors except for the first reactor are connected to the reflux unit as described above, a mixed gas generated in the rest of the reactors can also be refluxed in the reflux unit, and a separate reflux facility is not additionally required, so that the economic feasibility and efficiency of a process can be improved.

Specifically, according to an embodiment of the present invention, one or more reactors selected among the second reactor to the N-th reactor can be connected to the condenser and the layer separator of the reflux unit, a mixed gas generated during a reaction in the connected reactor can be transferred to the condenser, and a portion of an alcohol layer separated from the layer separator can be transferred to the reactor.

According to another embodiment of the present invention, one or more reactors selected among the second reactor to the N-th reactor can be connected to the condenser and the reflux column of the reflux unit, a mixed gas generated during a reaction in the connected reactor can be transferred to the condenser, and a portion of unreacted alcohol in a liquid state transferred from the reflux column to the first reactor can be transferred to the connected reactor.

According to yet another embodiment of the present invention, one or more reactors selected among the second reactor to the N-th reactor can be connected to the reflux column and the layer separator of the reflux unit, a mixed gas generated during a reaction in the connected reactor can be transferred to the reflux column, and a portion of an alcohol layer separated from the layer separator can be transferred to the reactor.

According to still yet another embodiment of the present invention, one or more reactors selected among the second reactor to the N-th reactor can be connected to the reflux column of the reflux unit, a mixed gas generated during a reaction in the connected reactor can be transferred to the reflux column, and a portion of unreacted alcohol in a liquid state transferred from the reflux column to the first reactor is transferred to the connected reactor.

As described above, when the second reactor to the N-th reactor are connected to the reflux unit, reflux processes can be efficiently integrated, and energy which can be unnecessarily consumed in a reflux process can also be reduced.

Meanwhile, according to still yet another embodiment of the present invention, the reflux unit included in the system for producing a diester-based composition of the present invention includes 4) a pre-condenser 3 directly connected to the reflux column and condensing a portion of the unreacted alcohol of the mixed gas, and 5) a gas-liquid separation device 4 directly connected to the pre-condenser and receiving the mixed gas and the unreacted alcohol in a liquid state and then transferring the mixed gas to the condenser and the unreacted alcohol in a liquid state to the reflux column. In this case, the alcohol layer recovered through the layer separator can be transferred to the gas-liquid separation device.

The pre-condenser and the gas-liquid separation device can be positioned between the reflux column and the condenser in the reflux unit, and are to condense only a portion of the mixed gas first before condensing all of the mixed gas in the condenser, and to allow the remaining mixed gas to be condensed in the subsequent condenser. Specifically, the mixed gas transferred from the reflux column is partially condensed while passing through the pre-condenser. In the pre-condenser, 50 to 95%, preferably 70 to 95% of the introduced mixed gas can be condensed. Since the boiling point of water is lower than the boiling point of alcohol, if the temperature at which condensation is performed is set to a temperature between the boiling point of water and the boiling point of alcohol, alcohol can be selectively condensed. Accordingly, in a condensate obtained through the pre-condenser, unreacted alcohol in a liquid state and a mixed gas containing unreacted alcohol in a gaseous state which has not been condensed and water are included. The pre-condenser is not particularly limited as long as it can adjust the temperature at which condensation is performed. For example, a heat exchanger for performing heat exchange through cooling water can be included as the pre-condenser. The unreacted alcohol in a liquid state which has passed through the first pre-condenser and the mixed gas are transferred to a subsequent gas-liquid separation device.

The gas-liquid separation device is for separating a mixed gas and unreacted alcohol in a liquid state. Unreacted alcohol in a gaseous state remaining in the mixed gas can be liquefied and separated through a subsequent condenser and then a layer separator to be re-introduced to the gas-liquid separation device. Thus, the gas-liquid separation device can serve to collect all recovered unreacted alcohol in a liquid state and introduce the same into the reflux column. The shape or type of the gas-liquid separation device is not particularly limited. For example, a gas-liquid separation device in a drum form can be used. When gas-liquid separation is performed, a liquid is positioned at a lower portion and a gas is positioned at an upper portion, so that it is preferable that an upper portion of the gas-liquid separation device is connected to the condenser and a lower portion thereof is connected to the reflux column.

As described above, according to an embodiment of the present invention for a case in which the pre-condenser and the gas-liquid separation device are included in the reflux unit, as illustrated in FIG. 1, one or more reactors selected among the second reactor to the N-th reactor can be connected to the reflux column and the gas-liquid separation device of the reflux unit, a mixed gas generated during a reaction in the connected reactor can be transferred to the reflux column, and a portion of unreacted alcohol in a liquid state transferred from the gas-liquid separation device to the reflux column can be transferred to the connected reactor.

Figure 2:
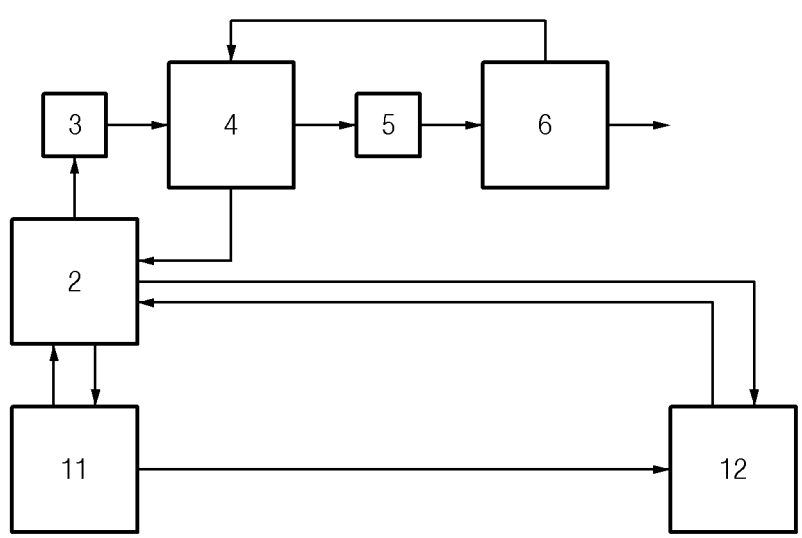

As illustrated in FIG. 2, according to another embodiment of the present invention, one or more reactors selected among the second reactor to the N-th reactor can be connected to the reflux column of the reflux unit, a mixed gas generated during a reaction in the connected reactor can be transferred to the reflux column, and a portion of unreacted alcohol in a liquid state transferred from the reflux column to the first reactor can be transferred to the connected reactor.

Figure 3:
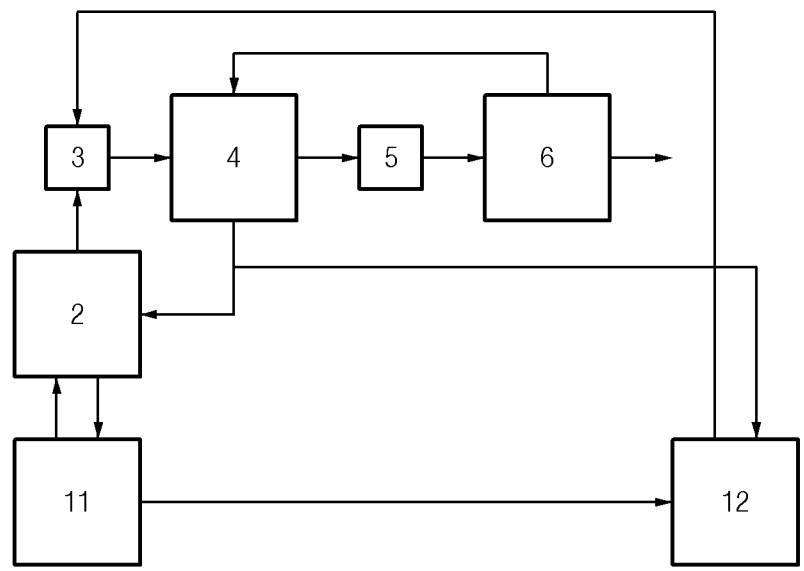

As illustrated in FIG. 3, according to yet another embodiment of the present invention, one or more reactors selected among the second reactor to the N-th reactor can be connected to the pre-condenser and the gas-liquid separation device of the reflux unit, a mixed gas generated during a reaction in the connected reactor can be transferred to the pre-condenser, and a portion of unreacted alcohol in a liquid state transferred from the gas-liquid separation device to the reflux column can be transferred to the connected reactor.

Figure 4:
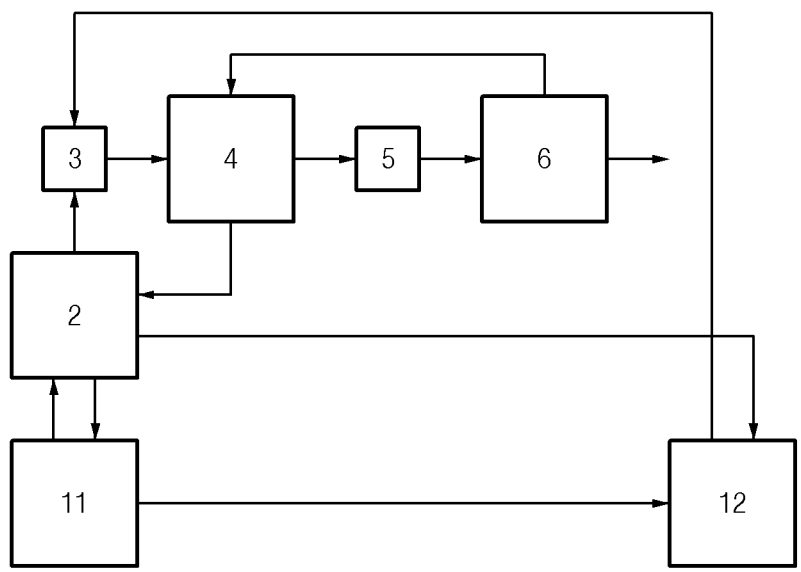

As illustrated in FIG. 4, according to still yet another embodiment of the present invention, one or more reactors selected among the second reactor to the N-th reactor can be connected to the pre-condenser and the reflux column of the reflux unit, a mixed gas generated during a reaction in the connected reactor can be transferred to the pre-condenser, and a portion of unreacted alcohol in a liquid state transferred from the reflux column to the first reactor can be transferred to the connected reactor.

Figure 5:
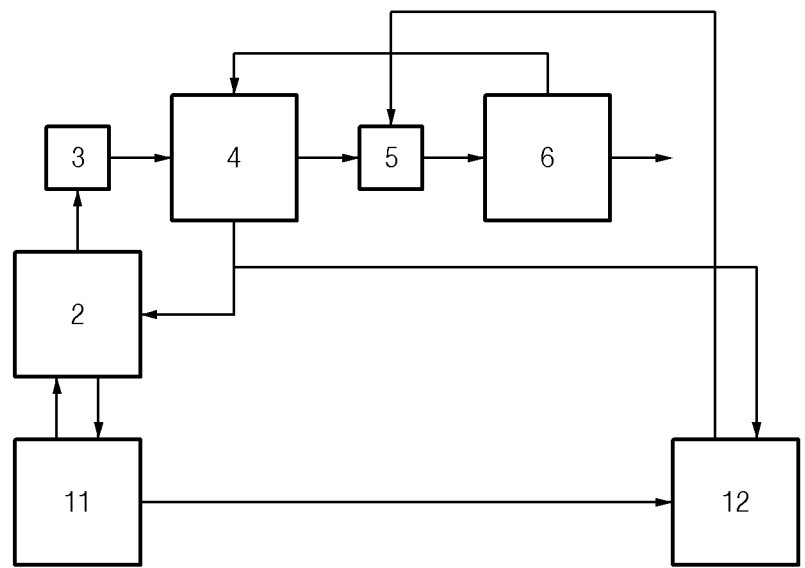

As illustrated in FIG. 5, according to still yet another embodiment of the present invention, one or more reactors selected among the second reactor to the N-th reactor can be connected to the condenser and the gas-liquid separation device of the reflux unit, a mixed gas generated during a reaction in the connected reactor can be transferred to the condenser, and a portion of unreacted alcohol in a liquid state transferred from the gas-liquid separation device to the reflux column can be transferred to the connected reactor.

Figure 6:
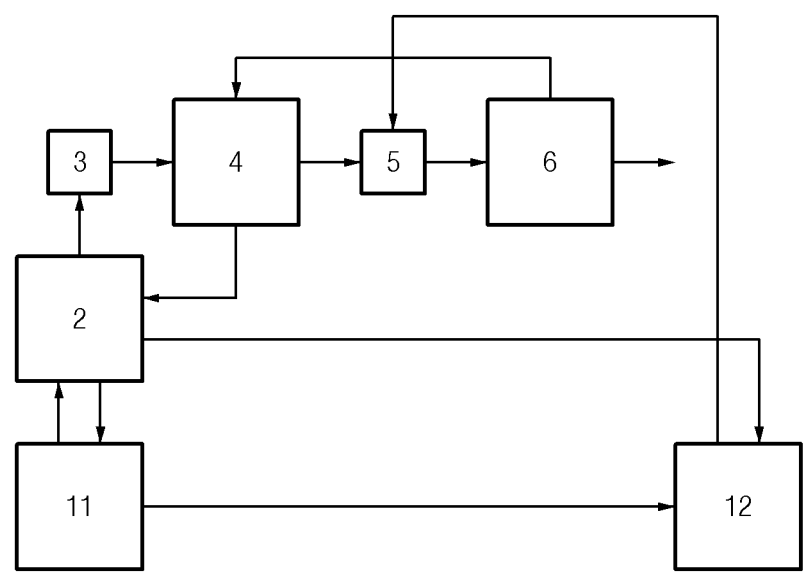

As illustrated in FIG. 6, according to still yet another embodiment of the present invention, one or more reactors selected among the second reactor to the N-th reactor can be connected to the condenser and the reflux column of the reflux unit, a mixed gas generated during a reaction in the connected reactor can be transferred to the condenser, and a portion of unreacted alcohol in a liquid state transferred from the reflux column to the first reactor can be transferred to the connected reactor.

As in the case in which the pre-condenser and the gas-liquid separation device are not included, even in the case in which the pre-condenser and the gas-liquid separation device are included and the second reactor to the N-th reactor are connected to the reflux unit as described above, reflux processes can be efficiently integrated, and energy which may be unnecessarily consumed in a reflux process can also be reduced.

Meanwhile, in the system for producing a diester-based composition of the present invention, it is preferable that the number of reactors, that is, N, is 2 to 10, more preferably 2 to 5. When the number of reactors increases, there is an advantage in that it is possible to control process variables in more detail, so that the optimization of an entire process can be further facilitated. However, when considering that more space is additionally required to install reactors in proportion to the increasing number of reactors and that each reactor should be independently controlled, there is a problem in that the ease of operation of an entire production process is reduced.

Dicarboxylic acid, which is a reaction raw material of an esterification reaction performed in each reactor of the system for producing a diester-based composition of the present invention, can be one or more selected from the group consisting of terephthalic acid, phthalic acid, isophthalic acid, and cyclohexane dicarboxylic acid. In addition, alcohol, which is another reaction raw material, can be one or more selected from primary alcohols having 3 to 12 alkyl carbon atoms. The alcohol includes all of linear, branched, or cyclic alcohols. When such reaction materials are used, the efficiency of the production system of the present invention can be further increased, a diester-based composition produced thereby can more excellently serve as a plasticizer.

Those skilled in the art may practice the present invention by adding components other than the components described above to the extent that problem solving means of the present invention are applied as they are. For example, a pre-mixer and the like may be applied for the uniform mixing of alcohol and dicarboxylic acid which are reaction raw materials, or a pump for the smooth transfer between each component may be additionally applied. It is apparent that the additional implementation of such components is also included in the scope of the invention.

EXAMPLES

Hereinafter, preferred Examples are presented to aid in understanding of the present invention. However, the following Examples are merely illustrative of the present invention and are not intended to limit the scope of the present invention.

Figure 7:
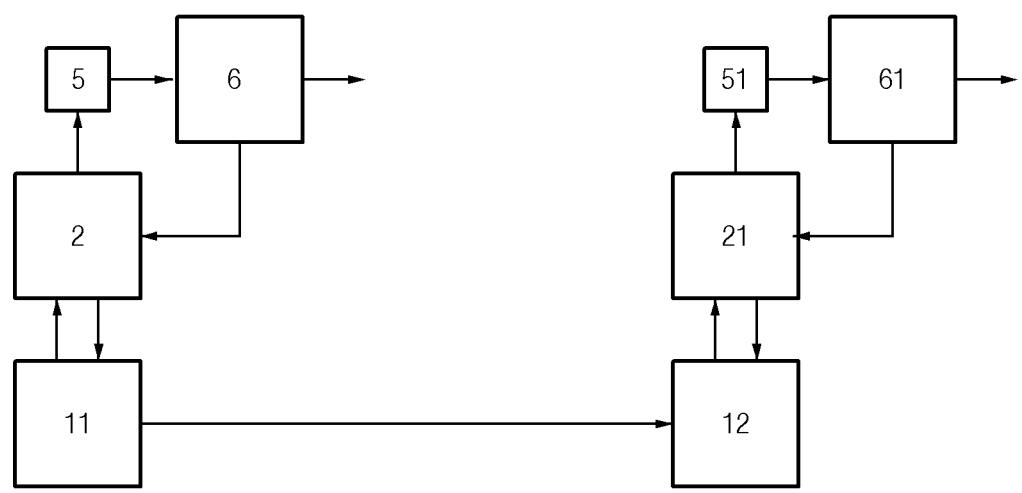
FIG. 7 is a simplified diagram of a system for producing a diester-based composition of Comparative Example, wherein each reactor is provided with a separate reflux unit.

A system for producing a diester-based composition was configured as shown in each of FIG. 2, FIG. 4, and FIG. 7, and terephthalic acid was selected as the dicarboxylic acid and octanol was selected as the alcohol. The steam usage amount for each case was calculated using Aspen Plus, which is a chemical process simulation program. The system for producing a diester-based composition configured as shown in each of FIGS. 2 and 4 was respectively set to Examples 1 and 3 of the present invention, and the system for producing a diester-based composition configured as shown in FIG. 7 was set to Comparative Example. The calculation results are shown in Table 1 below.

TABLE 1

| | Steam usage amount of first reactor (kg/hr) | Steam usage amount of second reactor (kg/hr) | Total steam usage amount (kg/hr) | Steam usage rate of first reactor compared to Comparative Example (%) | Steam usage rate of second reactor compared to Comparative Example (%) | Total steam usage rate compared to Comparative Example (%) |
|---|---|---|---|---|---|---|
| Comparative Example | 4706 | 560 | 5266 | — | — | — |
| Example 1 | 4044 | 515 | 4559 | 86 | 92 | 87 |
| Example 2 | 4043 | 514 | 4557 | 86 | 92 | 87 |

From the results above, it can be confirmed that the production system of diester-based composition of the present invention is energy efficient since the steam usage amount can be reduced compared to Comparative Example.

DESCRIPTION OF THE REFERENCE NUMERALS OR SYMBOLS

11: First reactor
12: Second reactor
2: Reflux column
21: Separate reflux column provided in the second reactor
3: Pre-condenser
4: Gas-liquid separation device
5: Condenser
51: Separate condenser provided in the second reactor
6: Layer separator
61: Separate layer separator provided in the second reactor.

The invention claimed is:

1. A system for producing a diester-based composition, the system comprising:
a first reactor to an N-th reactor connected in series in which an esterification reaction of dicarboxylic acid and alcohol is performed; and
a reflux unit connected to the first reactor and selectively separating unreacted alcohol from a mixed gas generated during the esterification reaction and then refluxing the separated unreacted alcohol to the first reactor, wherein the reflux unit includes:
1) A reflux column for receiving the mixed gas and unreacted alcohol in a liquid state from the first reactor and then transferring the mixed gas to a condenser and the unreacted alcohol in a liquid state to the first reactor;
2) the condenser for condensing the mixed gas; and
3) a layer separator for separating alcohol and water from a condensate passed through the condenser, wherein the layer separator discharges a water layer and allows an alcohol layer to be recovered,
wherein:
one or more reactors selected among a second reactor to the N-th reactor are additionally connected to the reflux unit; and
N is an integer of 2 to 10,
wherein the reflux unit further comprises:
4) a pre-condenser directly connected to the reflux column and condensing a portion of unreacted alcohol in the mixed gas; and
5) a gas-liquid separation device directly connected to the pre-condenser and receiving the mixed gas and the unreacted alcohol in a liquid state and then transferring the mixed gas to the condenser and the unreacted alcohol in a liquid state to the reflux column,
wherein the alcohol layer recovered through the layer separator is transferred to the gas-liquid separation device.

2. The system of claim 1, wherein:
one or more reactors selected among the second reactor to the N-th reactor are connected to the condenser and the layer separator of the reflux unit;
a mixed gas generated during the esterification reaction in the one or more connected reactors are transferred to the condenser; and
a portion of an alcohol layer separated from the layer separator is transferred to the one or more connected reactors.

3. The system of claim 1, wherein:
one or more reactors selected among the second reactor to the N-th reactor are connected to the condenser and the reflux column of the reflux unit;
a mixed gas generated during the esterification reaction in the one or more connected reactors are transferred to the condenser; and
a portion of unreacted alcohol in a liquid state transferred from the reflux column to the first reactor is transferred to the one or more connected reactors.

4. The system of claim 1, wherein:
one or more reactors selected among the second reactor to the N-th reactor are connected to the reflux column and the layer separator of the reflux unit;
a mixed gas generated during the esterification reaction in the one or more connected reactors are transferred to the reflux column; and a portion of an alcohol layer separated from the layer separator is transferred to the one or more connected reactors.

5. The system of claim 1, wherein:

one or more reactors selected among the second reactor to the N-th reactor are connected to the reflux column of the reflux unit;

a mixed gas generated during the esterification reaction in the one or more connected reactors are transferred to the reflux column; and a portion of unreacted alcohol in a liquid state transferred from the reflux column to the first reactor is transferred to the one or more connected reactors.

6. The system of claim 1, wherein:

one or more reactors selected among the second reactor to the N-th reactor are connected to the pre-condenser and the gas-liquid separation device of the reflux unit;

a mixed gas generated during the esterification reaction in the one or more connected reactors are transferred to the pre-condenser; and a portion of unreacted alcohol in a liquid state transferred from the gas-liquid separation device to the reflux column is transferred to the one or more connected reactors.

7. The system of claim 1, wherein:

one or more reactors selected among the second reactor to the N-th reactor are connected to the pre-condenser and the reflux column of the reflux unit;

a mixed gas generated during the esterification reaction in the one or more connected reactors are transferred to the pre-condenser; and a portion of unreacted alcohol in a liquid state transferred from the reflux column to the first reactor is transferred to the one or more connected reactors.

8. The system of claim 1, wherein:

one or more reactors selected among the second reactor to the N-th reactor are connected to the gas-liquid separation device and the reflux column of the reflux unit;

a mixed gas generated during the esterification reaction in the one or more connected reactors are transferred to the reflux column; and a portion of unreacted alcohol in a liquid state transferred from the gas-liquid separation device to the reflux column is transferred to the one or more connected reactors.

9. The system of claim 1, wherein:

one or more reactors selected among the second reactor to the N-th reactor are connected to the reflux column of the reflux unit;

a mixed gas generated during the esterification reaction in the one or more connected reactors are transferred to the reflux column; and a portion of unreacted alcohol in a liquid state transferred from the reflux column to the first reactor is transferred to the one or more connected reactors.

\* \* \* \* \*